(12) United States Patent
Faruquie et al.

(10) Patent No.: US 10,339,107 B2
(45) Date of Patent: Jul. 2, 2019

(54) MULTI-LEVEL COLOCATION AND PROCESSING OF SPATIAL DATA ON MAPREDUCE

(71) Applicant: International Business Machines Corporation, Armonk, NY (US)

(72) Inventors: Tanveer A. Faruquie, White Plains, NY (US); Himanshu Gupta, New Delhi (IN); Sriram Lakshminarasimhan, Chennai (IN); Sameep Mehta, New Delhi (IN); Stuart A. Siegel, Millburn, NJ (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 14/733,434

(22) Filed: Jun. 8, 2015

(65) Prior Publication Data
US 2016/0357775 A1    Dec. 8, 2016

(51) Int. Cl.
*G06F 17/30* (2006.01)
*G06F 16/17* (2019.01)
*G06F 16/13* (2019.01)

(52) U.S. Cl.
CPC .......... *G06F 16/1727* (2019.01); *G06F 16/13* (2019.01)

(58) Field of Classification Search
CPC .................................................. G06F 17/30
USPC ....................................................... 707/797
See application file for complete search history.

(56) References Cited

U.S. PATENT DOCUMENTS

| | | | |
|---|---|---|---|
| 6,446,060 B1* | 9/2002 | Bergman | G06F 16/58 707/770 |
| 7,024,402 B2* | 4/2006 | Morimoto | G06F 16/29 707/776 |
| 7,397,958 B2* | 7/2008 | Le Leannec | H04N 21/234327 375/E7.012 |
| 8,204,313 B2* | 6/2012 | Wheeler | G01S 17/89 382/195 |
| 8,478,790 B2 | 7/2013 | Annapragada | |
| 8,838,608 B2* | 9/2014 | Milby | G06F 16/2255 707/743 |
| 9,031,325 B2* | 5/2015 | Ouzounis | G06K 9/00637 382/190 |
| 9,119,055 B2* | 8/2015 | Vaccari | H04W 4/21 |
| 10,074,145 B2* | 9/2018 | Budlong | G06F 16/29 |

(Continued)

OTHER PUBLICATIONS

Eltabakh et al. CoHadoop: Flexible Data Placement and it's Exploitation in Hadoop, Proceedings of the VLDB Endowment, vol. 4, No. 9, 2011, pp. 575-585.

(Continued)

*Primary Examiner* — Kim T Nguyen
(74) *Attorney, Agent, or Firm* — Ryan, Mason & Lewis, LLP

(57) ABSTRACT

Methods, systems, and computer program products for multi-level colocation and analytical processing of spatial data on MapReduce are provided herein. A method includes correlating multiple items of spatial data and multiple items of attribute data within a file system to generate multiple blocks of correlated data; colocating each of the multiple blocks of correlated data on a given node within the file system based on a data block placement policy; and clustering multiple replicas generated for each of the multiple data blocks at multiple levels of spatial granularity within the file system.

20 Claims, 5 Drawing Sheets

(56) References Cited

U.S. PATENT DOCUMENTS

2011/0302151 A1   12/2011  Abadi et al.
2014/0188825 A1    7/2014  Muthukkaruppan et al.
2016/0179581 A1*  6/2016  Soundararajan ...... G06F 9/5033
                                                                          718/104

OTHER PUBLICATIONS

Dittrich et al. Hadoop++: Making a Yellow Elephant Run Like a Cheetah (Without it Even Noticing), Proceedings of the VLDB Endowment, vol. 3, No. 1, 2010, pp. 1-12.
Dittrich et al. Only Aggressive Elephants are Fast Elephants, VLDB 2012, pp. 1-12.
Richter et al. Towards Zero-Overheard Adaptive Indexing in Hadoop, VLDB 2013, pp. 1-13.
Aji et al. Hadoop-GIS: A High Performance Spatial Data Warehousing System Over MapReduce, Proceedings of the VLDB Endowment, vol. 6, No. 11, 2013, pp. 1009-1020.
Eldawy, SpatialHadoop: Towards Flexible and Scalable Spatial Proceedings Using MapReduce, SIGMOD'14, PhD Symposium, Jun. 22, 2014, pp. 1-5.

* cited by examiner

MULTI-LEVEL COLOCATION AND PROCESSING OF SPATIAL DATA ON MAPREDUCE

FIELD

The present application generally relates to information technology, and, more particularly, to MapReduce techniques.

BACKGROUND

In traditional MapReduce frameworks, a portion of data is divided into large blocks of fixed sizes, replicated, and randomly distributed across the available nodes. With such an approach, however, logically colocated spatial blocks in spatial data sets commonly become physically fragmented on disks. Such blocks subsequently have to be aggregated for most spatial analytics operations, thus incurring significant data movement costs.

SUMMARY

In one aspect of the present invention, techniques for multi-level colocation and processing of spatial data are provided. An exemplary computer-implemented method can include steps of correlating multiple items of spatial data and multiple items of attribute data within a file system to generate multiple blocks of correlated data; colocating each of the multiple blocks of correlated data on a given node within the file system based on a data block placement policy; and clustering multiple replicas generated for each of the multiple data blocks at multiple levels of spatial granularity within the file system.

In another aspect of the invention a method can include steps of generating one or more replicas for (i) each of multiple items of spatial data within a file system and (ii) each of multiple items of attribute data within the file system; correlating, for each of the replicas, each of the multiple items of spatial data and each of the multiple items of attribute data within the file system to generate multiple blocks of correlated data; colocating each of the multiple blocks of correlated data on a given node within the file system based on a data block placement policy such that each of the one or more replicas for (i) each of the multiple items of spatial data and (ii) each of the multiple items of attribute data are contained in different data blocks; and clustering the replicas, each contained in a different data block, at multiple levels of spatial granularity within the file system.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
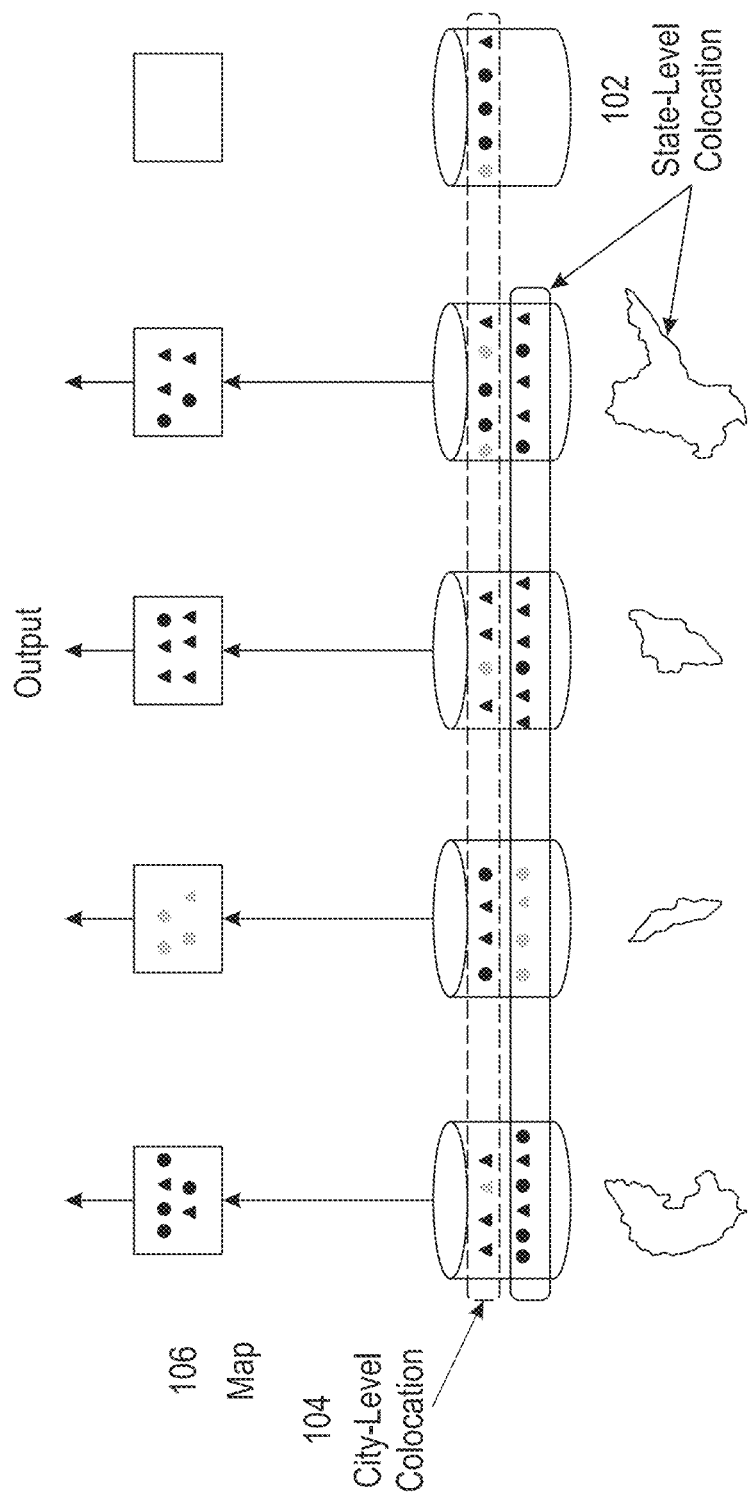
FIG. 1 is a diagram illustrating spatial and attribute colocation, according to an example embodiment of the invention.

As described herein, an aspect of the present invention includes multi-level colocation and analytical processing of spatial data on MapReduce. Additionally, at least one embodiment of the invention includes techniques for data colocation and placement to minimize shuffle cost and balance parallelism across different scales of analytics. Such embodiments improve the performance of spatial analytics on MapReduce, for example, by colocating data on a distributed file system. As detailed herein, and as would be appreciated by one skilled in the art, colocation pertains to positioning relevant data on the same node.

Additionally, as described herein, at least one embodiment of the invention includes colocating correlated data across multiple levels, and matching one or more analytical operations to a given (for example, optimal) data layout strategy. As used herein, "correlated data" refers to data exhibiting locality along dimensions of interest (for example, space and/or time). In at least one embodiment of the invention, two data sets are considered "correlated" if the two data sets share common dimensions such as geographic locality, time window applicability, and/or demographic classification (for example, "all women," "all men," "all people older than a given age," etc.), which imply that the two data sets need to be accessed from local storage and read into machine memory together. Such data sets can be physically colocated on a block device within a compute node to avoid network bottlenecks that can occur if such data are on different block devices in a distributed file system.

In one or more embodiments of the invention, the types of analytical operations utilized can include spatial or location-based analytics operations that can occur over different aggregations, such as but not limited to, cities, villages, states, etc. Data layout strategies also follow a similar theme, wherein colocation and layouts occur at city-level, town-level, state-level, etc.

One or more embodiments of the invention include extending a block layout policy by ensuring correlated data (across space and one or more attributes) are colocated on the same node. As used herein, data layout implies block layout. As also used herein, "block layout policy" can refer to the extendible part of Hadoop's® implementation that allows users to create their own instructions on how to place blocks of data on available nodes within a cluster. By aggregating different amounts of correlated data for each replica, the colocation is guaranteed not just across one spatial level, but across multiple spatial levels. Further, one or more embodiments of the invention also include mapping a given analytics operation to the layout policy/strategy to improve the performance of multi-scale spatial analytics on MapReduce. Such mapping includes executing the given analytics with a layout suited for its level of operation to improve performance; that is, such mapping includes matching and executing.

It should be appreciated that one or more embodiments of the invention are applicable to a variety of domains that use spatio-temporal data such as agriculture, oil and natural gas, weather, etc.

As used herein, spatial data refers to data with a spatial component. Such data are commonly associated, for example, with a region in a geographic information system (GIS). Spatial data can also be associated with different domains, as well as different sources and data types. By way of example, such sources and associated data types can include raster graphics (associated, for example, with satellite images), vectors (associated, for example, with farm boundary polygons), text data (associated, for example, with social media posts with a geo-location component), etc.

Spatial data analytics can include analytics that are implemented at multiple spatial levels. For example, such analytics can include computing yield output for each of multiple farms, estimating elevation values on a uniform grid at ten meter resolution for each of multiple cities, and identifying the top five states in the United States by yield output of corn from the year 2010.

In accordance with one or more embodiments of the invention, analytics operations can require aggregation across spatial regions over one or more datasets. By way of example, such aggregation might include correlating soil data, weather data, and elevation data for each of multiple regions.

As detailed herein, at least one embodiment of the invention includes reducing data movement and/or shuffling in a file system (such as, for example, a Hadoop® distributed file system (HDFS)) to obtain an optimal data layout strategy. Such an embodiment includes colocating correlated data (across space and attributes) on the same node in the file system based on a given data block placement policy, and clustering data block replicas at multiple-levels of spatial granularity.

Accordingly, one or more embodiments of the invention include techniques for organizing spatial data on a file system such as Hadoop® or MapReduce. Such an embodiment can include obtaining and/or maintaining spatial data which are colocated at a certain granularity. For example, if the data are colocated at town-level-granularity, it implies that all of the data for a town are stored at one machine. If there are n villages, then there will be n such groups, with each group stored at one machine. These n groups are distributed across the machines in the cluster. In at least one embodiment of the invention, the user decides the colocation levels (city, county, state, etc.) prior to ingesting the data into the systema For each data file that is ingested, the spatial information within the data determines the nodes in the cluster where the replica blocks of the data should reside. In this example, for a replica of a village, a node is randomly chosen among available nodes (depending on the amount of available storage), and all data corresponding to that village are stored on the chosen node. Additionally, such colocation helps in improving the query performance.

Figure 2:
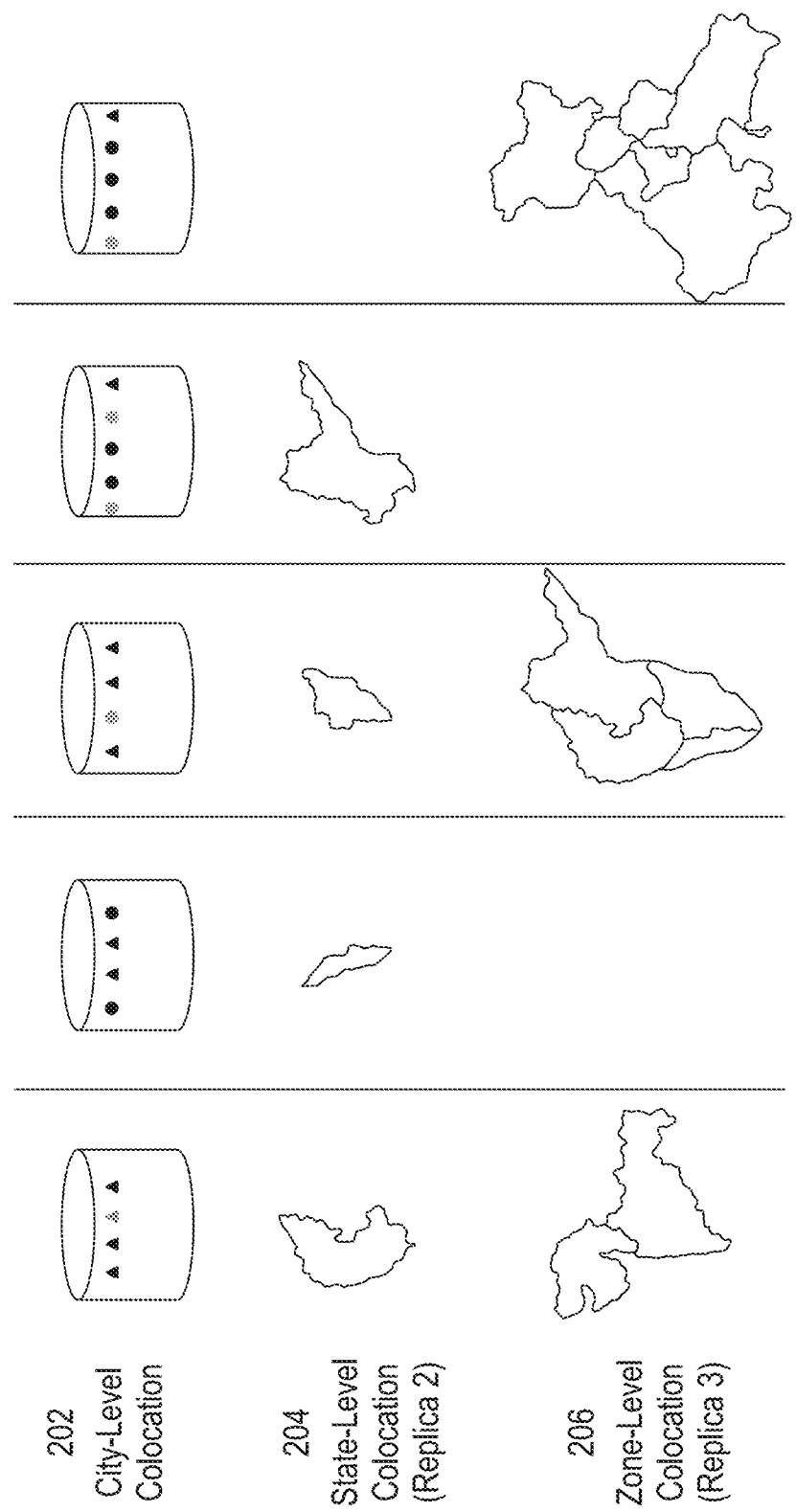
FIG. 2 is a diagram illustrating spatial and attribute colocation, according to an example embodiment of the invention.

In an example Hadoop®/MapReduce environment, data are replicated m number of times. By way of example and illustration, assume a scenario wherein m equals three. This implies that for each of the n groups, there will be three replicas. Accordingly, in such an example, there are, overall, 3*n replicas. These 3*n replicas are then distributed across the machines in the cluster. Additionally, at least one embodiment of the invention includes placing these 3*n replicas in such a way so that spatial data are colocated at multiple granularities (for example, city. district, state, etc.). To place the replicas, one or more embodiments of the invention include maintaining an index (such as depicted in FIG. 2, for example) that stores information about the Hadoop® blocks in the system and their corresponding allocation of replicas to nodes, based on their spatial information. The nodes for these blocks are selected randomly from the cluster, based on availability of storage space.

By way of illustration, consider an example wherein there are three replicas for each town. An example embodiment of the invention can include placing the replicas in a way such that there are three machines on which the data for a town are present, two machines on which all of the data for a county are present, and one machine on which all of the data for a state are present. Accordingly, an aspect of the invention includes leveraging the fact that Hadoop® maintains a given number (for example, three) replicas of each data block to organize spatial data such that colocation is enabled for a given number (for example, three) different spatial granularities. If a larger number of replicas is used, at least one embodiment of the invention includes enable colocation at a larger number of granularities. Colocation is important as it significantly improves the query performance if the query involves analytics at the same granularity at which colocation is present. Having colocation at multiple granularities improves performance, for example, for a larger set of queries.

FIG. 1 is a diagram illustrating spatial and attribute colocation, according to an example embodiment of the invention. By way of illustration, FIG. 1 depicts a map-related set of data 106, a city-level colocation of data 104, and a state-level colocation of data 102. Each object depicted in FIG. 1, whether a circle or a triangle, represents some data that belong to a particular city. The objects are characterized by shape and color. Shape represents an attribute of the data, for example, a set of temperature values recorded in the year 2014 (circle), pressure values recorded in the year 2014 (triangle), etc., for one city. In one or more embodiments of the invention, color or shading can represent objects (with the same color or shading) belonging to the same state. As depicted in FIG. 1, at least one embodiment of the invention includes moving spatial aggregation to disk-level, and utilizing multiple replicas. Further, at least one embodiment of the invention additionally transitions a MapReduce task to a map-only task for different scales of analytics.

Further, FIG. 1 illustrates colocation for two replicas, one at a city-level 104 and one at a state-level 102. As noted, each object represents data collected for a particular city. In the dashed box (104), the city data are distributed across all of the available nodes. In the lined box (102), it is ensured that the data across cities but belonging to a particular state are contained within a single node.

FIG. 2 is a diagram illustrating spatial and attribute colocation, according to an example embodiment of the invention. By way of illustration, FIG. 2 depicts city-level colocation 202, state-level colocation 204 and zone-level colocation 206. As described herein, each replica can be collocated at a different level of colocation. FIG. 2 illustrates an extension of FIG. 1, wherein another level of colocation is added, and a city-level, state-level and zonal-level (collection of states) layout is created.

Figure 3:
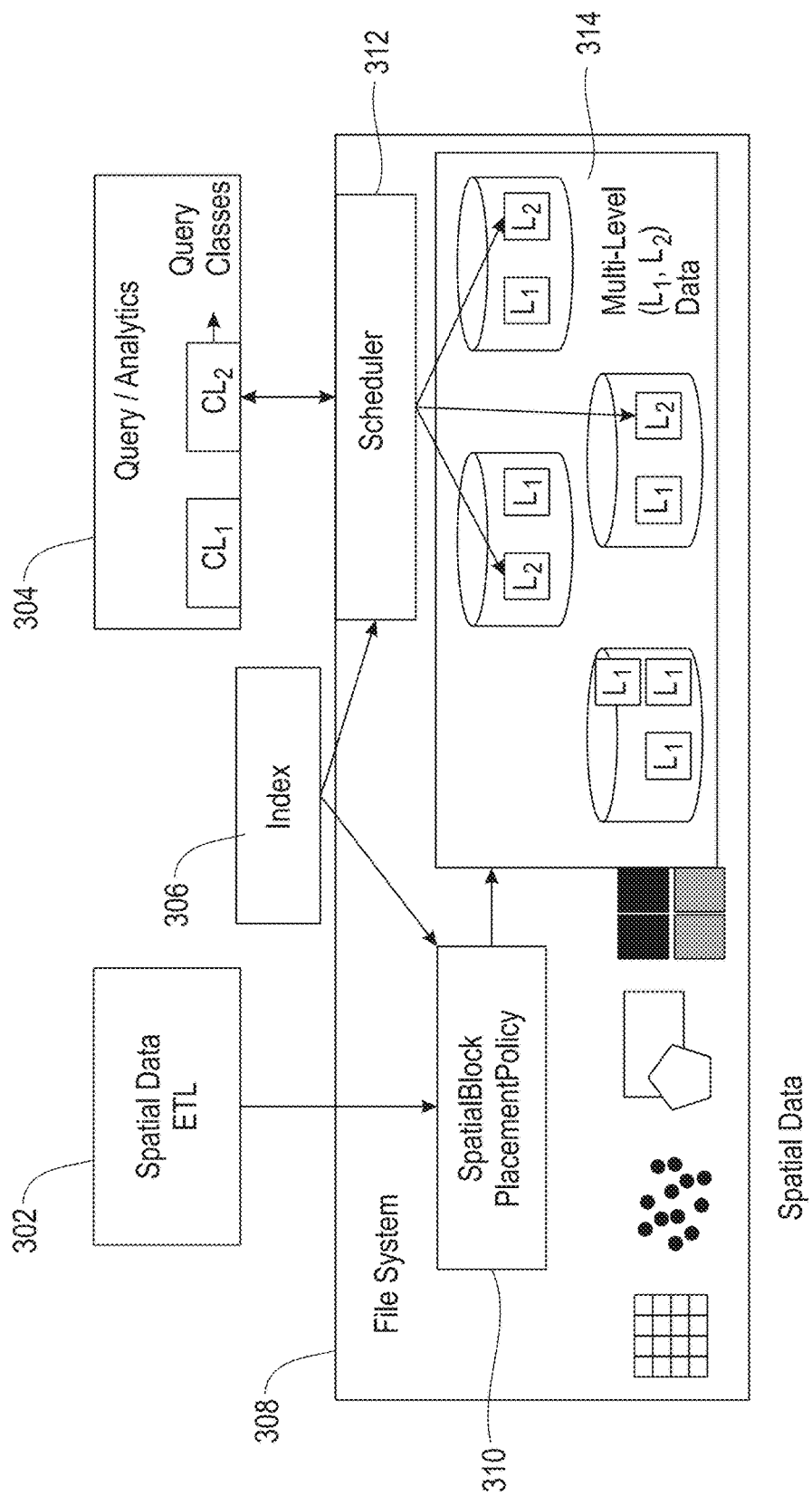
FIG. 3 is a diagram illustrating system architecture, according to an example embodiment of the invention.

FIG. 3 is a diagram illustrating system architecture, according to an example embodiment of the invention. By way of illustration, FIG. 3 depicts a spatial data extract, transform and load (ETL) component 302, a query and/or analytics component 304 with multiple query classes ($CL_1$, $CL_2$, etc.), an index component 306 and a file system component 308. Additionally, the file system component 308 includes a spatial block placement policy component 310, a scheduler component 312, and a multi-level ($L_1$, $L_2$, etc.) data component 314. The spatial block placement policy component 310, which receives input from the spatial data ETL component 302 as well as the index component 306, provides input to the multi-level data component 314. The scheduler component 312, which receives input from the query and/or analytics component 304 as well as the index component 306, provides input to the multi-level data component 314. Accordingly, FIG. 3 illustrates an end-to-end design of a system implementing at least one embodiment of the invention, from the ingestion of data into the file system to analytics.

More specifically, the spatial data ETL component 302 represents the start of an extract, transform, load operation of spatial data. The index component 306 is a table that stores the information about the data blocks and the nodes allocated for replicas within the cluster. The spatial block placement policy component 310 can include an extension to Hadoop's® block placement policy for colocating data in one or more embodiments of the invention. For each block ingested into the system, the index component 306 is engaged to identify where to place the blocks. The scheduler component 312 is the component that is responsible for breaking down queries to match to the appropriate data layout strategy. For queries that belong to class $CL_1$, for example, the corresponding data layout $L_1$ is chosen for the analytics.

Figure 4:
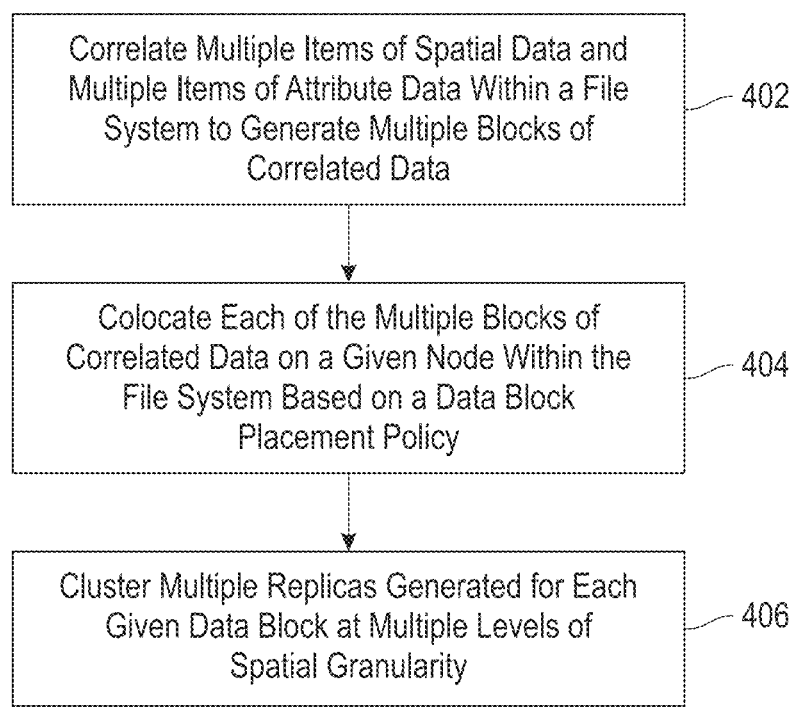
FIG. 4 is a flow diagram illustrating techniques according to an example embodiment of the invention.

FIG. 4 is a flow diagram illustrating techniques according to an embodiment of the present invention. Step 402 includes correlating multiple items of spatial data and multiple items of attribute data within a file system to generate multiple blocks of correlated data, wherein said correlating is carried out by a file system component executing on a computing device. The file system, as detailed herein, can include a file system implementing a MapReduce framework.

The multiple items of attribute data can include multiple items of data with a temporal component. Additionally, the multiple items of attribute data can include multiple items of attribute data associated with multiple domains The multiple items of spatial data can include multiple items of data associated with a region in a geographic information system. Further, the multiple items of spatial data can include multiple items of spatial data associated with multiple domains, multiple items of spatial data associated with multiple data sources, and/or multiple items of spatial data associated with multiple data types.

Step 404 includes colocating each of the multiple blocks of correlated data on a given node within the file system based on a data block placement policy, wherein said colocating is carried out by the file system component executing on the computing device. Step 406 includes clustering multiple replicas generated for each given data block at multiple levels of spatial granularity, wherein said clustering is carried out by the file system component executing on the computing device within the file system.

The techniques depicted in FIG. 4 can also include matching execution of one or more analytical operations from a set of multiple analytical operations of difference classes to the colocated blocks of correlated data. Further, the techniques depicted in FIG. 4 can additionally include aggregating different amounts of correlated data for each of the multiple replicas, as well as mapping a given analytics operation to the data block placement policy.

Also, at least one embodiment of the invention includes generating one or more replicas for (i) each of multiple items of spatial data within a file system and (ii) each of multiple items of attribute data within the file system, and correlating, for each of the replicas, each of the multiple items of spatial data and each of the multiple items of attribute data within the file system to generate multiple blocks of correlated data, wherein said correlating is carried out by a file system component executing on a computing device. Such an embodiment additionally includes colocating each of the multiple blocks of correlated data on a given node within the file system based on a data block placement policy such that each of the one or more replicas for (i) each of the multiple items of spatial data and (Ii) each of the multiple items of attribute data are contained in different data blocks, wherein said colocating is carried out by the file system component executing on the computing device. Further, such an embodiment includes clustering the replicas, each contained in a different data block, at multiple levels of spatial granularity within the file system, wherein said clustering is carried out by the file system component executing on the computing device.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 5:
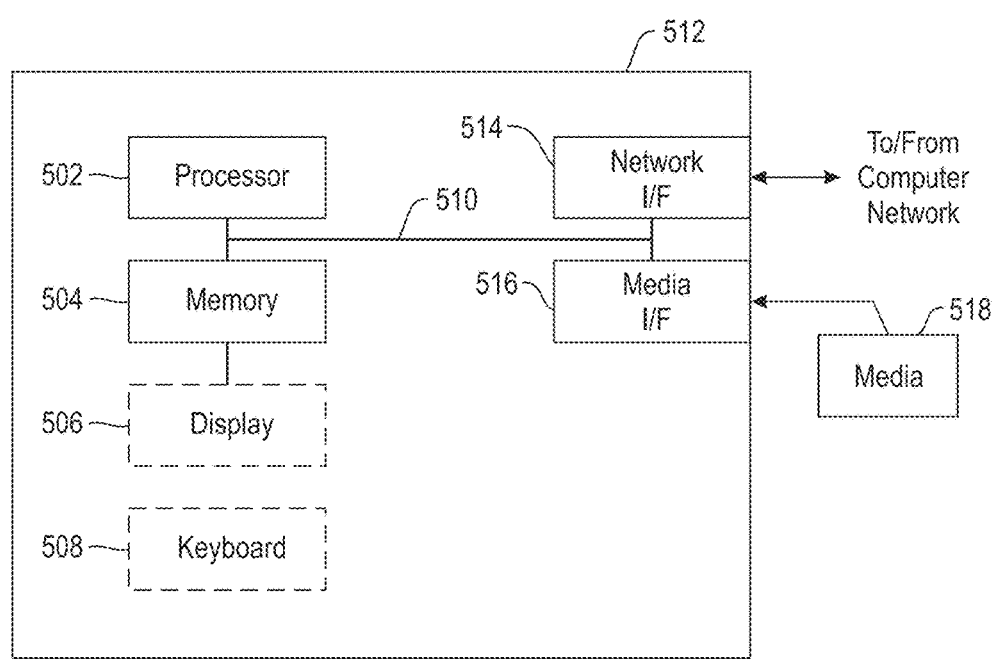
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access to memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules. In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise.: It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, providing multi-level, multi-dimensional data colocation along with an intelligent scheduling strategy.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   correlating multiple items of spatial data and multiple items of attribute data within a file system to generate multiple blocks of correlated data, wherein said correlating is carried out by a file system component executing on at least one computing device;
   colocating each of the multiple blocks of correlated data on a given node within the file system based on a data block placement policy, wherein said colocating is carried out by the file system component executing on the at least one computing device; and
   clustering at least a portion of multiple replicas generated for each of the multiple data blocks at multiple distinct and user-determined levels of spatial granularity, wherein all portions of the multiple replicas corresponding to a particular one of the multiple levels of spatial granularity are stored on a particular node attributed to the particular one of the multiple levels of spatial granularity, wherein portions of the multiple replicas correspond to specific ones of the multiple levels of spatial granularity based at least in part on spatial information contained within the portions of the multiple replicas, and wherein said clustering is carried out by the file system component executing on the at least one computing device within the file system.

2. The method of claim 1, comprising:
matching execution of one or more analytical operations from a set of multiple analytical operations of difference classes to the colocated blocks of correlated data.

3. The method of claim 1, comprising:
aggregating different amounts of correlated data for each of the multiple replicas.

4. The method of claim 1, comprising:
mapping a given analytics operation to the data block placement policy.

5. The method of claim 1, wherein the file system comprises a file system implementing a MapReduce framework.

6. The method of claim 1, wherein the multiple items of attribute data comprise multiple items of data with a temporal component.

7. The method of claim 1, wherein the multiple items of attribute data comprise multiple items of attribute data associated with multiple domains.

8. The method of claim 1, wherein the multiple items of spatial data comprise multiple items of data associated with a region in a geographic information system.

9. The method of claim 1, wherein the multiple items of spatial data comprise multiple items of spatial data associated with multiple domains.

10. The method of claim 1, wherein the multiple items of spatial data comprise multiple items of spatial data associated with multiple data sources.

11. The method of claim 1, wherein the multiple items of spatial data comprise multiple items of spatial data associated with multiple data types.

12. A computer program product, the computer program product comprising a computer readable storage medium having program instructions embodied therewith, the program instructions executable by a computing device to cause the computing device to:
correlate multiple items of spatial data and multiple items of attribute data within a file system to generate multiple blocks of correlated data;
colocate each of the multiple blocks of correlated data on a given node within the file system based on a data block placement policy; and
cluster at least a portion of multiple replicas generated for each of the multiple data blocks at multiple distinct and user-determined levels of spatial granularity within the file system, wherein all portions of the multiple replicas corresponding to a particular one of the multiple levels of spatial granularity are stored on a particular node attributed to the particular one of the multiple levels of spatial granularity, wherein portions of the multiple replicas correspond to specific ones of the multiple levels of spatial granularity based at least in part on spatial information contained within the portions of the multiple replicas.

13. A system comprising:
a memory; and
at least one processor coupled to the memory and configured for:

correlating multiple items of spatial data and multiple items of attribute data within a file system to generate multiple blocks of correlated data;
colocating each of the multiple blocks of correlated data on a given node within the file system based on a data block placement policy; and
clustering at least a portion of multiple replicas generated for each of the multiple data blocks at multiple distinct and user-determined levels of spatial granularity within the file system, wherein all portions of the multiple replicas corresponding to a particular one of the multiple levels of spatial granularity are stored on a particular node attributed to the particular one of the multiple levels of spatial granularity, wherein portions of the multiple replicas correspond to specific ones of the multiple levels of spatial granularity based at least in part on spatial information contained within the portions of the multiple replicas.

14. A method, comprising:
generating one or more replicas for (i) each of multiple items of spatial data within a file system and (ii) each of multiple items of attribute data within the file system;
correlating, for each of the replicas, each of the multiple items of spatial data and each of the multiple items of attribute data within the file system to generate multiple blocks of correlated data, wherein said correlating is carried out by a file system component executing on at least one computing device;
colocating each of the multiple blocks of correlated data on a given node within the file system based on a data block placement policy such that each of the one or more replicas for (i) each of the multiple items of spatial data and (ii) each of the multiple items of attribute data are contained in different data blocks, wherein said colocating is carried out by the file system component executing on the at least one computing device; and
clustering at least a portion of the replicas, each contained in a different data block, at multiple distinct and user-determined levels of spatial granularity within the file system, wherein all portions of the multiple replicas corresponding to a particular one of the multiple levels of spatial granularity are stored on a particular data block attributed to the particular one of the multiple levels of spatial granularity, wherein portions of the multiple replicas correspond to specific ones of the multiple levels of spatial granularity based at least in part on spatial information contained within the portions of the multiple replicas, and wherein said clustering is carried out by the file system component executing on the at least one computing device.

15. The method of claim 14, comprising:
matching execution of one or more analytical operations from a set of multiple analytical operations of difference classes to the colocated blocks of correlated data.

16. The method of claim 14, comprising:
aggregating different amounts of correlated data for each of the replicas.

17. The method of claim 14, comprising:
mapping a given analytics operation to the data block placement policy.

18. The method of claim 14, wherein the multiple items of attribute data comprise multiple items of data with a temporal component.

19. The method of claim 14, wherein the multiple items of spatial data comprise multiple items of spatial data associated with multiple data sources.

20. The method of claim 14, wherein the multiple items of spatial data comprise multiple items of spatial data associated with multiple data types.

* * * * *